(12) United States Patent
Lew

(10) Patent No.: US 9,411,447 B2
(45) Date of Patent: *Aug. 9, 2016

(54) USING A WAVEGUIDE TO DISPLAY INFORMATION ON ELECTRONIC DEVICES

(71) Applicant: Juniper Networks, Inc., Sunnyvale, CA (US)

(72) Inventor: Hogan Lew, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/166,124

(22) Filed: Jan. 28, 2014

(65) Prior Publication Data

US 2014/0139764 A1 May 22, 2014

Related U.S. Application Data

(63) Continuation of application No. 13/709,956, filed on Dec. 10, 2012, now Pat. No. 8,672,487, which is a continuation of application No. 12/651,343, filed on Dec. 31, 2009, now Pat. No. 8,331,749.

(51) Int. Cl.

| | |
|---|---|
| *G02B 9/08* | (2006.01) |
| *G06F 3/147* | (2006.01) |
| *G06F 3/041* | (2006.01) |
| *G02B 6/42* | (2006.01) |
| *F21V 8/00* | (2006.01) |
| *G02B 6/38* | (2006.01) |
| *G02B 6/08* | (2006.01) |
| *G02B 27/02* | (2006.01) |
| *G01D 11/28* | (2006.01) |

(52) U.S. Cl.
CPC ............. *G06F 3/041* (2013.01); *G01D 11/28* (2013.01); *G02B 6/0031* (2013.01); *G02B 6/0046* (2013.01); *G02B 6/0083* (2013.01); *G02B 6/08* (2013.01); *G02B 6/3897* (2013.01); *G02B 6/4249* (2013.01); *G02B 27/027* (2013.01); *G06F 3/147* (2013.01)

(58) Field of Classification Search
CPC .......... G02B 6/0046; G02B 6/08; G02B 6/06; G02B 6/4249; G02B 6/0083; G02B 6/0031; G02B 6/3897; G06F 3/041; G06F 3/147; G01D 11/28; B29D 11/00663; G09F 9/305; H04N 9/12; G02F 1/133308; G02F 1/13452; B60R 1/088; B60R 1/12

See application file for complete search history.

(56) References Cited

U.S. PATENT DOCUMENTS

| | | |
|---|---|---|
| 3,644,922 A | 2/1972 | James et al. |
| 3,744,048 A | 7/1973 | Treichel |
| 3,786,500 A | 1/1974 | Fiorletta et al. |
| 3,853,658 A | 12/1974 | Ney |
| 4,865,419 A | 9/1989 | Shepherd |
| 5,022,740 A | 6/1991 | Maziorka |

(Continued)

*Primary Examiner* — Sultan Chowdhury
*Assistant Examiner* — Magda Cruz
(74) *Attorney, Agent, or Firm* — Harrity & Harrity, LLP

(57) ABSTRACT

An electronic device includes an instrument panel that includes a display opening, where the instrument panel is located in a first plane; a circuit board located inside the electronic device, where the circuit board includes a display device that includes a display area, and where the display area is located in a second plane that is different from the first plane; and a waveguide that couples the display area to the display opening and guides light, and/or an image displayed in the display area, from the display area to the display opening.

20 Claims, 7 Drawing Sheets

(56) References Cited

U.S. PATENT DOCUMENTS

| | | | |
|---|---|---|---|
| 5,040,320 A | 8/1991 | Reidinger | |
| 5,066,947 A | 11/1991 | Du Castel | |
| 5,127,078 A | 6/1992 | Terry et al. | |
| 5,150,445 A | 9/1992 | Toyoda et al. | |
| 5,237,455 A * | 8/1993 | Bordo | G02B 27/0101 359/602 |
| 5,278,696 A | 1/1994 | Suvada | |
| 5,280,385 A | 1/1994 | Wybrow | |
| 5,293,437 A | 3/1994 | Nixon | |
| 5,384,882 A | 1/1995 | Shimamune et al. | |
| 5,502,457 A | 3/1996 | Sakai et al. | |
| 5,532,711 A | 7/1996 | Harris | |
| 5,790,322 A | 8/1998 | Kameda et al. | |
| 5,832,168 A | 11/1998 | Yenter | |
| 5,911,024 A | 6/1999 | Wallace | |
| 6,065,844 A | 5/2000 | Chen | |
| 6,195,016 B1 | 2/2001 | Shankle et al. | |
| 6,418,254 B1 | 7/2002 | Shikata et al. | |
| 6,457,834 B1 | 10/2002 | Cotton et al. | |
| 6,571,043 B1 | 5/2003 | Lowry et al. | |
| 6,628,867 B1 | 9/2003 | Solntsev | |
| 6,880,276 B2 * | 4/2005 | Strein | G09F 9/305 385/115 |
| 7,044,295 B2 | 5/2006 | Sugiyama | |
| 7,421,180 B2 | 9/2008 | Kuo et al. | |
| 7,811,640 B2 * | 10/2010 | Charters | B29D 11/00663 385/123 |
| 8,331,749 B2 * | 12/2012 | Lew | 385/116 |
| 8,672,487 B2 * | 3/2014 | Lew | G02B 6/0046 340/815.42 |
| 2008/0112189 A1 * | 5/2008 | Okuda | 362/617 |
| 2011/0158601 A1 | 6/2011 | Lew | |
| 2013/0100543 A1 | 4/2013 | Lew | |
| 2013/0271699 A1 * | 10/2013 | Chen | G02B 6/0083 349/62 |

* cited by examiner

USING A WAVEGUIDE TO DISPLAY INFORMATION ON ELECTRONIC DEVICES

RELATED APPLICATIONS

This application is a continuation of U.S. patent application Ser. No. 13/709,956, filed Dec. 10, 2012, which is a continuation of U.S. patent application Ser. No. 12/651,343, filed Dec. 31, 2009 (now U.S. Pat. No. 8,331,749), the disclosures of which are incorporated herein by reference.

BACKGROUND

Electronic devices may need to interact with the environment, with users, or with other electronic devices using input devices, output devices, or communication interface devices. An electronic device may include a housing structure that may protect the electronic device from the environment and may shield the electronic device from other electronic devices. The housing structure may be configured to hold the input devices, output devices, or communication interface devices of the electronic device. For example, the housing structure may include an instrument panel into which the input devices, output devices, or communication interface devices are mounted. However, the instrument panel may not be large enough to hold all the required devices, or mounting the input/output/communication devices at or near the panel may be difficult or impractical. Designing a housing structure that can accommodate all the required input devices, output devices, or communication interface devices may therefore be quite challenging.

SUMMARY OF THE INVENTION

According to one aspect, an electronic device may include an instrument panel that includes a display opening, where the instrument panel is located in a first plane; a circuit board located inside the electronic device, where the circuit board includes a display device that includes a display area, and where the display area is located in a second plane that is different from the first plane; and a waveguide that couples the display area to the display opening and guides light, and/or an image displayed in the display area, from the display area to the display opening.

According to another aspect, a method performed by an electronic device may include displaying information on a display area, the displaying being performed by a display device located inside the electronic device; guiding light, and/or an image of the information, from the display area to a display opening located on an instrument panel of the electronic device, the guiding being performed by a waveguide connected to the display area; and changing an apparent size of the displayed information from a size of the display area to a size of the display opening, the changing being performed by the waveguide.

According to yet another aspect, a system may include means for displaying information on a display area, located inside an electronic device and located in a plane that differs from a plane of a display opening located on an instrument panel of the electronic device; means for guiding light, and/or an image of the information, from the display area to the display opening; and means for changing an apparent size of the displayed information from a size of the display area to a size of the display opening.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

An electronic device may include a display device. The display device may provide information about the status of the electronic device or the status of components of the electronic device and/or may allow a user to configure or otherwise control the electronic device in combination with an input device. It may not be possible to place a display device on an instrument panel of the electronic device. For example, the display device may not fit on the instrument panel because of size (e.g., the display device may be too big), or may interfere with other devices mounted on the instrument panel by experiencing and/or causing electromagnetic or mechanical interference.

Implementations described herein may relate to mounting a display device inside an electronic device away from an instrument panel. The display device may be mounted, for example, on a printed circuit board assembly of the electronic device. A display opening may be provided in the instrument panel for displaying the output of the display device and a waveguide may be provided to guide light, and/or an image displayed in the output area of the display device, from the output area of the display device to the display opening located on the instrument panel. Additionally, the waveguide may alter the perceived size of the display area of the display device, making the display area larger or smaller, based on the size of the display opening. Thus, a user may be able to view the output of the display device through the display opening. Furthermore, a display device located away from the instrument panel area may no longer be susceptible to static discharge and may contribute less to any electromagnetic compatibility issues of the electronic device. Moreover, a cable connecting the display device to the printed circuit board assembly of the electronic device may no longer be needed.

A waveguide may be defined as any structure that guides light, or an image displayed on a first surface area, from the first surface area to a second surface area. Implementations described herein may provide a waveguide in the form of, for example, one or more prisms, one or more mirrors, or one or more fiberoptic cables. Alternatively, other ways of implementing the waveguide may be used.

Figure 1:
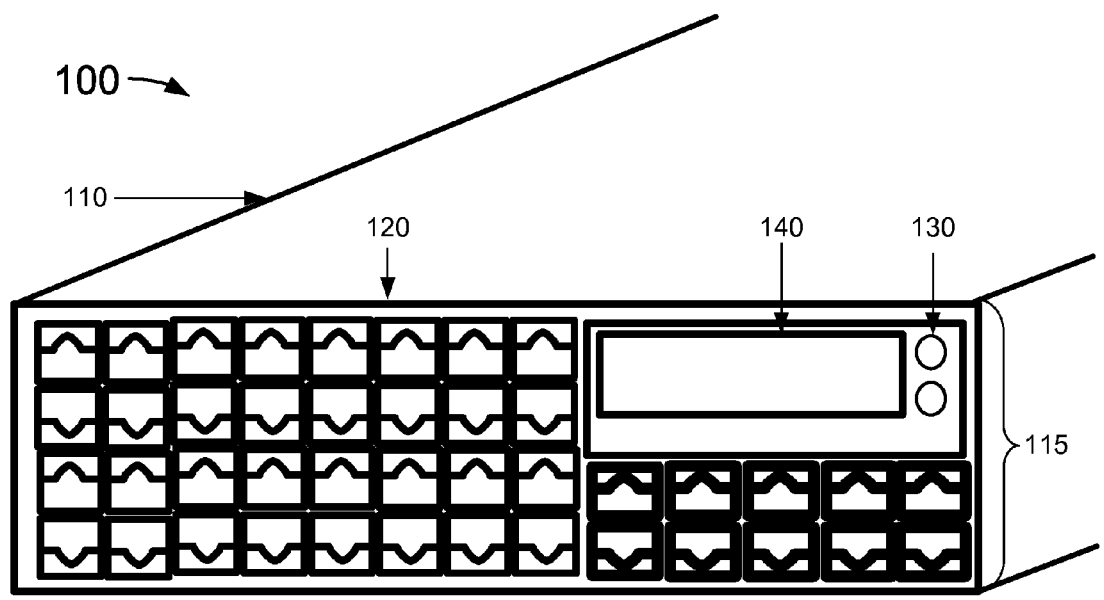
FIG. 1 is a diagram illustrating an exemplary electronic device according to an implementation described herein.

FIG. 1 is a diagram illustrating an exemplary electronic device 100 according to an implementation described herein. Electronic device 100 may include, for example, a network device, such as a switch, a router, a firewall, a gateway, a wireless access point, an intrusion detection and prevention appliance, or a virtual private network (VPN) appliance. Electronic device 100 may include a housing 110 and an instrument panel 115.

Housing 110 may include a structure that protects components of electronic device 100 from outside elements. Housing 110 may be formed from a variety of materials. For example, housing 110 may be formed from plastic, metal, or a composite material. Instrument panel 115 may include a structure that is configured to hold devices and components used in electronic device 100. Instrument panel 115 may be formed from a variety of materials. For example, instrument panel 115 may be formed from plastic, metal, or a composite material. In one implementation, instrument panel 115 may be part of housing 110. In another implementation, instrument panel 115 may be a separate structure from housing 110 and may be fastened to housing 110 using any fastening technique. For example, instrument panel 115 may be fastened to housing 110 using mechanical fasteners and/or be held in place with grooves located in housing 110.

Instrument panel 115 may include one or more communication interface devices 120, one or more input devices 130, and a display opening 140.

Communication interface devices 120 may include components that enable electronic device 100 to communicate with other electronic devices. In the example of FIG. 1, where electronic device 100 is depicted as a network device, communication interface device 120 may take the form of ports that enable electronic device 100 to be connected to other electronic devices via cables.

Input devices 130 may enable a user to interact with electronic device 100 to cause electronic device 100 to perform one or more operations. In the example of FIG. 1, where electronic device 100 is depicted as a network device, input devices 130 may take the form of one or more buttons. The buttons may be used, for example, to scroll through information being displayed via display opening 140 and/or to make selections of items being displayed.

Display opening 140 may display information provided by a display device mounted inside electronic device 100 and located away from instrument panel 115. Display opening 140 may be of a different size than a display area of a display device and may be coupled to a waveguide that guides light, and/or an image being displayed in a display area, from the display area of a display device to display opening 140. Display opening 140 may be covered with a thin piece of transparent material, such as a piece of glass or acrylic.

Although FIG. 1 shows exemplary components of electronic device 100, in other implementations, electronic device 100 may contain fewer, different, additional, or differently arranged components than depicted in FIG. 1. Additionally or alternatively, one or more components of electronic device 100 may perform one or more tasks described as being performed by one or more other components of electronic device 100. For example, while electronic device 100 has been described in the context of a network device, electronic device 100 may include any electronic device that may include a display device, such as a set-top box, a remote control device, a media player device (e.g., a DVD player), etc.

Figure 2:
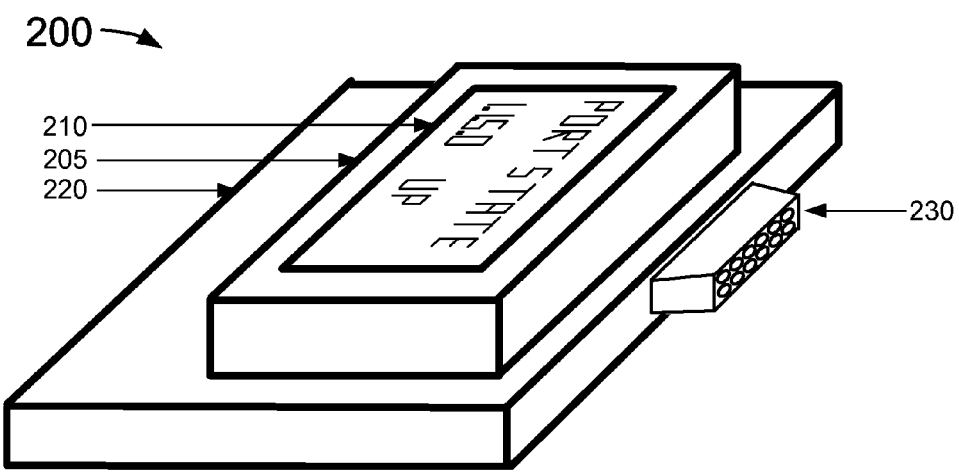
FIG. 2 is a diagram illustrating an exemplary display device according to an implementation described herein.

FIG. 2 is a diagram illustrating an exemplary display device 200 according to an implementation described herein. Display device 200 may include any device that displays information, such as a liquid crystal display (LCD); light emitting diode (LED) display or organic light emitting diode (OLED) display; an electronic ink display, such as an electrophoretic or electrowetting display; a plasma screen display; an electroluminescent display; a field emission (FE) display; or a cathode ray tube (CRT) display. In a particular implementation, display device 200 may be configured to display one or more lines of alphanumeric characters.

Display device 200 may include a display element 205, a control unit 220, and a connector plug 230. Display element 205 may include display elements that display information within a display area 210. For example, if display device 200 includes an LCD, display element 205 may house a liquid crystal layer and electrodes used to control pixels of the liquid crystal layer. Additionally, display element 205 may include a backlight to illuminate display area 210.

Control unit 220 may include components to control display element 205. For example, control unit 220 may include a driver electronic circuit that receives information and causes display element 205 to display the information in display area 210 by controlling pixels of display element 205. In one implementation, connector plug 230 may include one or more electrical connections to control unit 220. In another implementation, display device 200 may not include connector plug 230. Rather, display device 200 may include pins that allow display device 200 to be mounted directly into a printed circuit board.

Although FIG. 2 shows exemplary components of display device 200, in other implementations, display device 200 may contain fewer components, different components, additional components, or differently arranged components than depicted in FIG. 2. Additionally or alternatively, one or more components of display device 200 may perform one or more tasks described as being performed by one or more other components of display device 200.

Figure 3A:
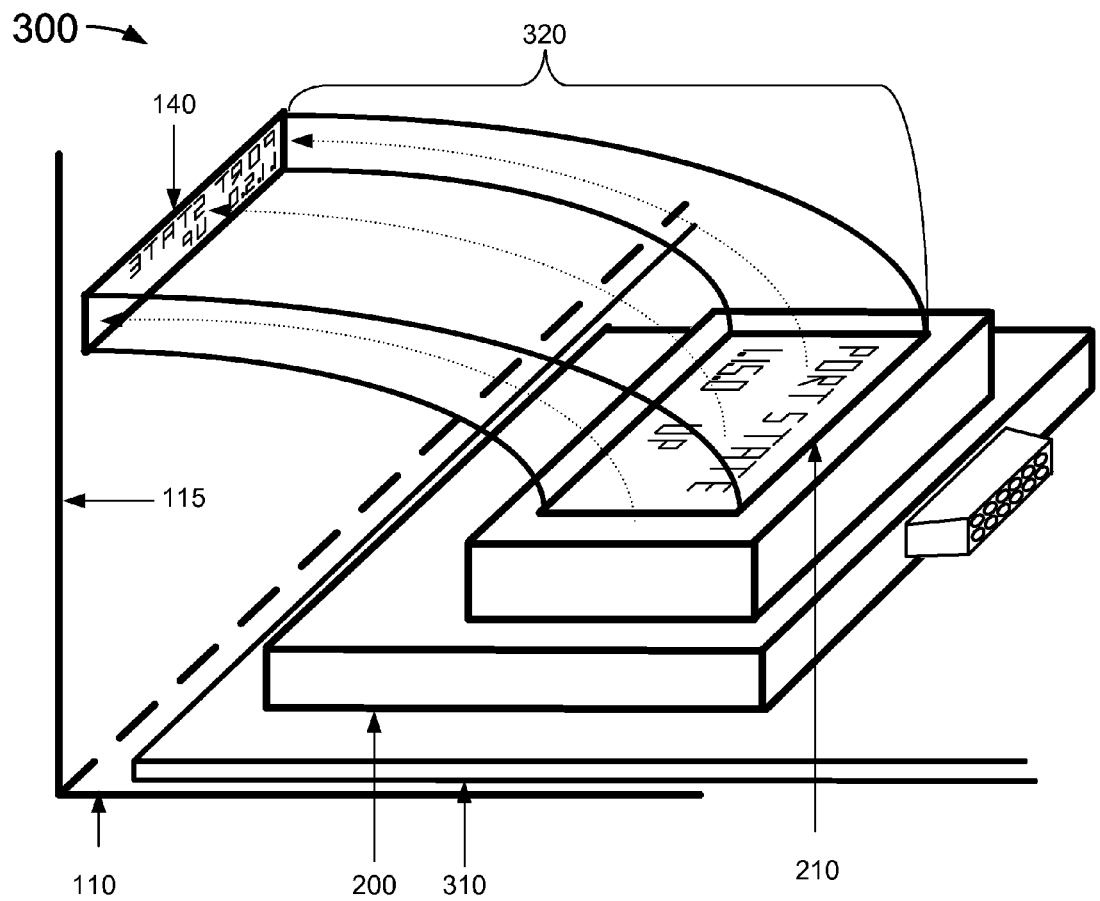
FIG. 3A is a diagram illustrating an exemplary device that includes the display device of FIG. 2 connected to the electronic device of FIG. 1 via a waveguide.

FIG. 3A is a diagram illustrating an exemplary internal view of a portion 300 of electronic device 100. Portion 300 may include electronic device 100, display device 200, and waveguide 320.

Portion 300 may include a circuit board 310 that may include components of electronic device 100. Circuit board 310 may be located away from instrument panel 115 and may be located in a different plane than a plane of instrument panel 115. For example, circuit board 310 may be located in a plane that is perpendicular to a plane in which instrument panel 115 is located. Display device 200 may be mounted onto circuit board 310.

Figure 3B:
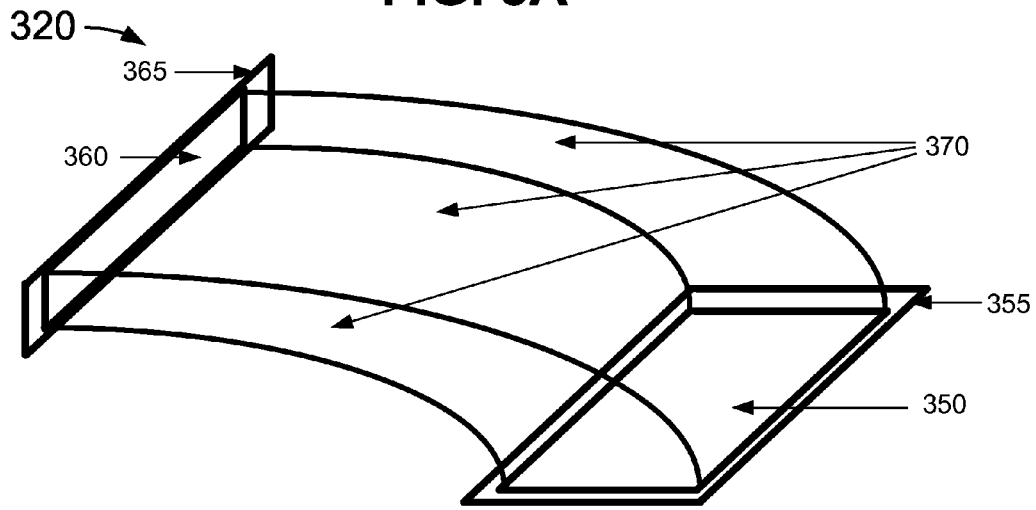
FIG. 3B is a diagram illustrating the waveguide of FIG. 3A.

Waveguide 320 may connect display area 210 to display opening 140. Exemplary surfaces of waveguide 320 are shown in FIG. 3B. Waveguide 320 may include a first surface area 350, a second surface area 360, and one or more side surfaces 370.

First surface area 350 may be positioned against display area 210 and may be approximately the same size as display area 210. First surface area 350 may be optically transparent to allow transmission of light from display area 210 into waveguide 320. Second surface area 360 may be positioned against display opening 140 and may be approximately the same size as display opening 140. Second surface area 360 may be optically transparent to allow transmission of light from within waveguide 320 out through display opening 140.

Side surfaces 370 may include any surfaces that will give waveguide 320 the necessary shape to guide light from first surface area 350 to second surface area 360. Side surfaces 370 may be optically reflective surfaces to reflect light internally within waveguide 320 and allowing light from first surface 350 to reach second surface 360.

In one implementation, first surface area 350 may include first fastening area 355 and second surface area 360 may include second fastening area 365. First fastening area 355 may be used to fasten first surface area 350 to display area 210 and second fastening area 365 may be used to fasten second surface area 360 to instrument panel 115. Waveguide 320 may be fastened using a mechanical fastening technique, such as by using screws, or using a chemical fastening technique, such as by using an adhesive.

In another implementation, first surface area 350 may not include first fastening area 355 and/or second surface area 360 may not include second fastening area 365. Rather, first surface area 350 and second surface area 360 may be fastened to display unit 205 and to a transparent covering of display opening 140 directly, by using a fusing technique that preserves optical transparency, or by using an optically transparent adhesive. For example, if waveguide 320 includes an acrylic material and if display unit 205 and the transparent covering of display opening 140 also include an acrylic material, waveguide 320 may be fastened by applying an acrylic solvent to first surface area 350 and second surface area 360.

Waveguide 320 may be formed from any optically transparent material. For example, waveguide 320 may be include a glass material, or a transparent polymer material, such as an acrylic (i.e., poly(methyl methacrylate)) material or a polycarbonate material. Alternatively, waveguide 320 may include a photonic crystal configured to guide light from first surface 350 to second surface 360.

Waveguide 320 may be configured to adjust the perceived size of display area 210 to the size of display opening 140. In one implementation, the perceived size of display area 210 may be adjusted through the use of one or more lenses. For example, a lens may be provided on second surface 360 to change the perceived size of display area 210 to the size of display opening 140. In another implementation, the perceived size of display area 210 may be adjusted through the use of one or more refractive surfaces inside waveguide 320. For example, waveguide 320 may include multiple prisms, which, when stacked together, form the shape of waveguide 320, where the abutting surfaces of the multiple prisms are designed to refract the light transmitted through waveguide 320 in such a way as to change the perceived size of display area 210 to the size of display opening 140.

Although FIG. 3A shows exemplary components of portion 300, in other implementations, portion 300 may contain fewer components, different components, additional components, or differently arranged components than depicted in FIG. 3A. Additionally or alternatively, one or more components of portion 300 may perform one or more tasks described as being performed by one or more other components of portion 300.

Although FIG. 3B shows exemplary surfaces of waveguide 320, waveguide 320 may contain fewer surfaces, different surfaces, additional surfaces, differently arranged surfaces, or differently shaped surfaces than depicted in FIG. 3B. Additionally or alternatively, one or more surfaces of waveguide 320 may have properties described as properties by one or more other surfaces of waveguide 320.

For example, while waveguide 320 is depicted has having a rectangular first surface and a rectangular second surface and having curved side surfaces, it should be understood that waveguide 320 may include any shape that will guide light from display area 210 to display opening 140. Furthermore, waveguide 320 need not include one continuous piece of material, but may include multiple pieces. In one implementation, the multiple pieces may be serially arranged and not necessarily connected, where the light from a first piece enters the light from a second piece (see, e.g., FIG. 5). In another implementation, the multiple pieces may guide light from display area 210 to display opening 140 in parallel (see, e.g., FIG. 7).

Figure 4:
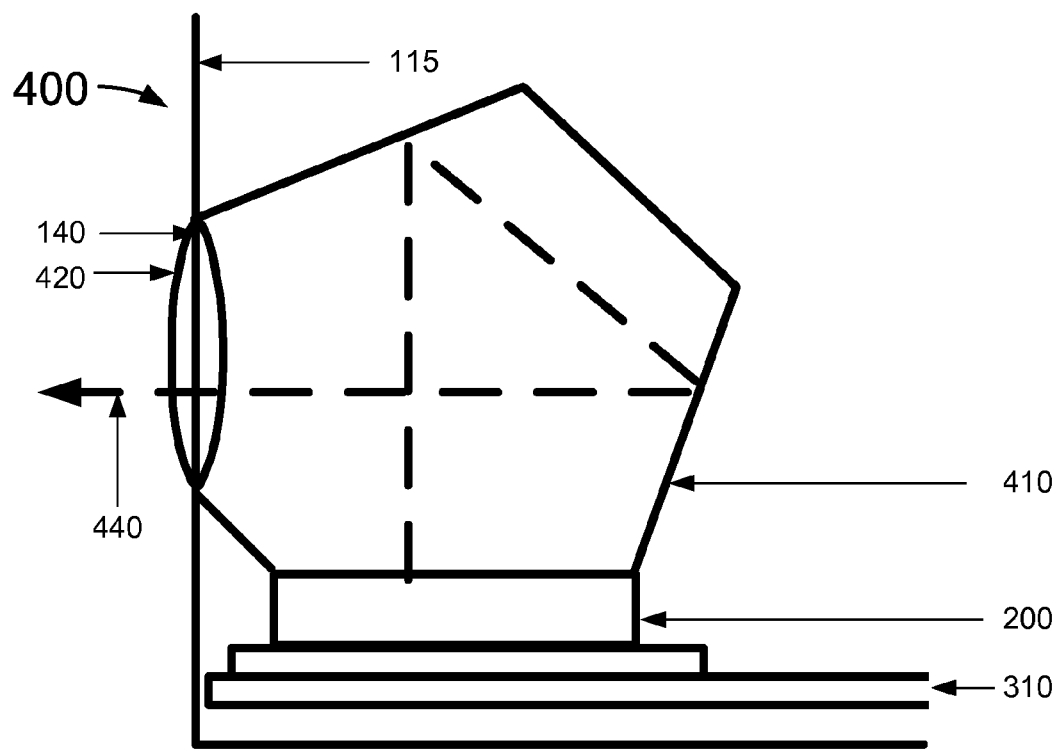
FIG. 4 is a diagram illustrating a first exemplary device to guide light from the display device of FIG. 2 to an opening in the housing of the electronic device of FIG. 1 using a prism.

FIGS. 4-7 illustrate different implementations of a waveguide according to implementations described herein. FIG. 4 is a diagram illustrating a first exemplary device 400 to guide light from a display area to a display opening using a prism and a lens located at a display opening. Device 400 may include instrument panel 115, display device 200, circuit board 310, a prism 410, and a lens 420. As illustrated, display device 200 may be mounted onto circuit board 310.

Prism 410 may connect display area 210 to display opening 140. Prism 410 may include, for example, a five-sided reflective prism that may guide light from display area 210 to display opening 140. Light exiting display area 210 may follow light path 440. Light may exit display area 210, travel upward, get reflected by the upper surface of five-sided prism 410 toward the back surface of five-sided prism 410, get reflected by the back surface of five-sided prism 410 toward the front, and travel to the front toward display opening 410. The use of a five-sided prism may allow the transmission of light through a right angle without inversion of light images.

Lens 420 may include a lens that bends light to change the appearance of display area 210 to a different size. In one implementation, lens 420 may change the appearance of display area 210 to the size of display opening 140. In another implementation, lens 420 may magnify the appearance of display opening 140 to make information appearing in display opening 140 appear larger.

Although FIG. 4 shows exemplary components of device 400, in other implementations, device 400 may contain fewer components, different components, additional components, or differently arranged components than depicted in FIG. 4. Additionally or alternatively, one or more components of device 400 may perform one or more tasks described as being performed by one or more other components of device 400.

Figure 5:
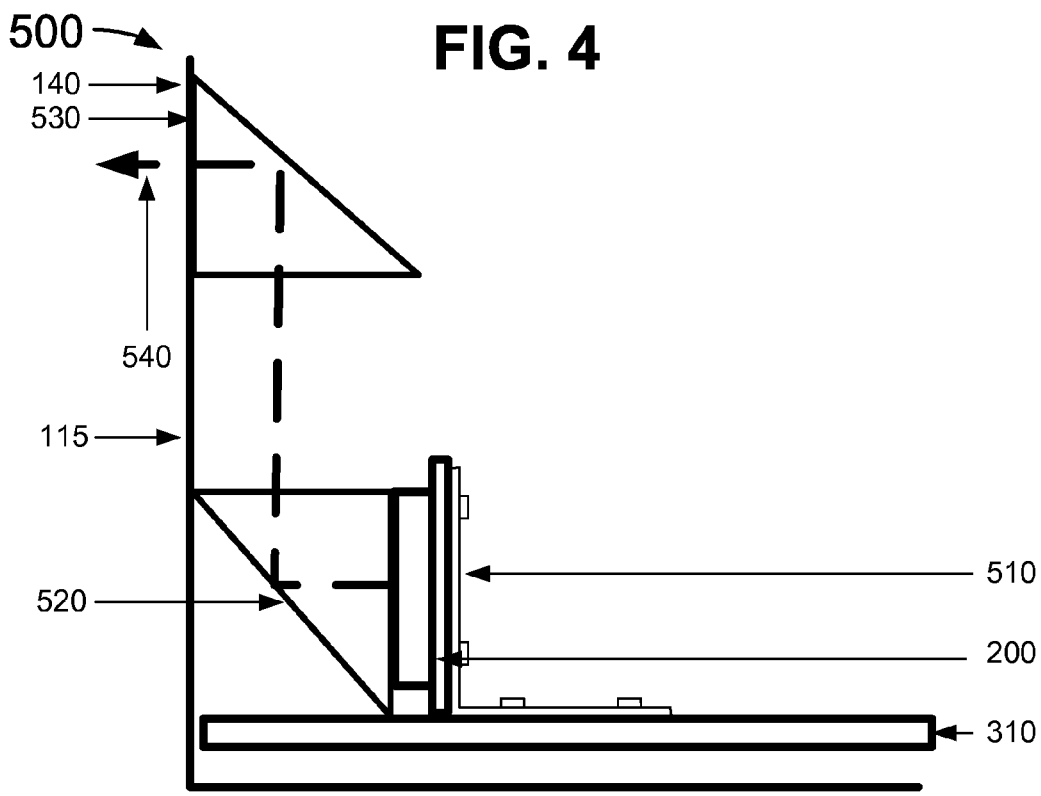
FIG. 5 is a diagram illustrating a second exemplary device to guide light from the display device of FIG. 2 to an opening in the housing of the electronic device of FIG. 1 using prisms.

FIG. 5 is a diagram illustrating a second exemplary device 500 to guide light from a display area to a display opening using more than one prism. Device 500 may include instrument panel 115, display device 200, circuit board 310, a first prism 520, and a second prism 530. As illustrated, display device 200 may be mounted onto circuit board 310 using bracket 510. Bracket 510 may position display device 200 in a plane that is approximately parallel to instrument panel 115. Positioning display device 200 in a plane approximately parallel to instrument panel 115 may align display area 210 in a plane approximately parallel to display opening 140. Aligning display area 210 in a plane approximately parallel to display opening 140 may allow the use of two right angle prisms to guide light from display area 210 to display opening 140.

First prism 520 may include a right angle prism with a diagonal reflective surface and second prism 530 may include a right angle prism with a diagonal reflective surface. First prism 520 and second prism 530 may be aligned so that light exiting display area 210 follows light path 540 to display opening 140. Light may exit display area 210, enter first prism 520, get reflected by the diagonal surface of first prism 520 upward, travel upward to enter second prism 530, get reflected by the diagonal surface of second prism 530 forward, and travel forward toward display opening 140.

Although FIG. 5 shows exemplary components of device 500, in other implementations, device 500 may contain fewer components, different components, additional components, or differently arranged components than depicted in FIG. 5. Additionally or alternatively, one or more components of device 500 may perform one or more tasks described as being performed by one or more other components of device 500.

Figure 6:
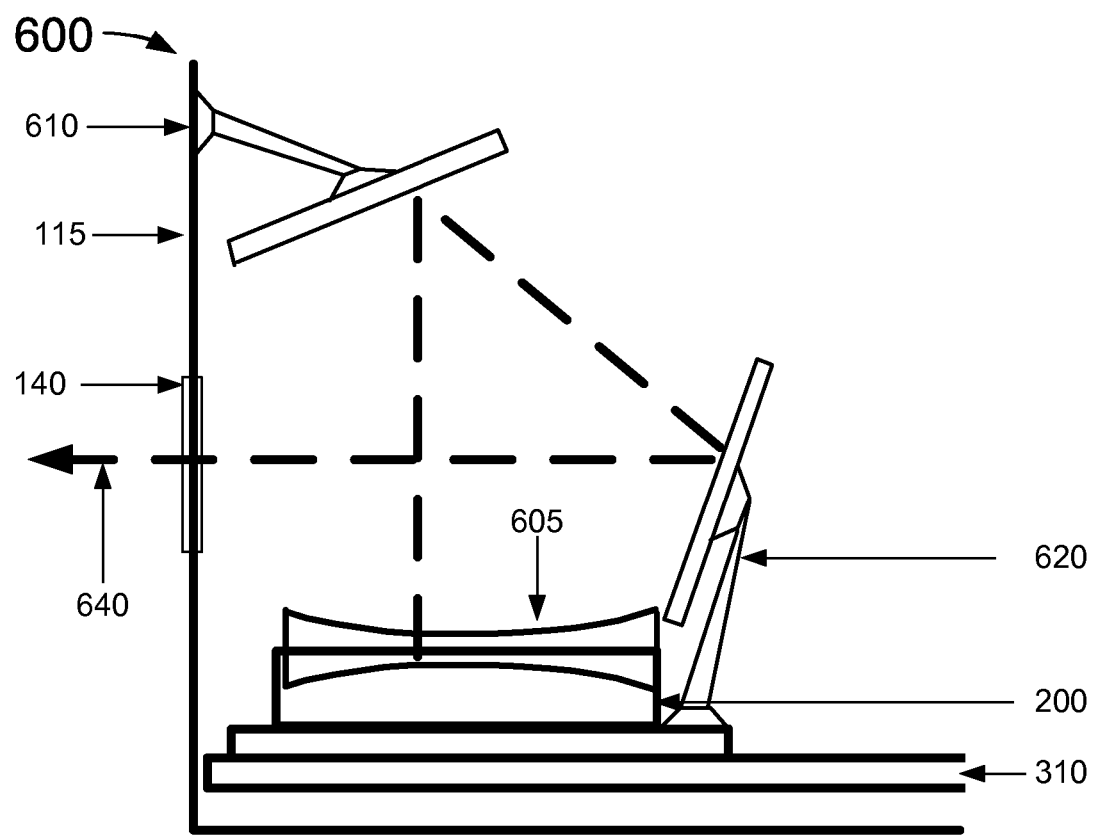
FIG. 6 is a diagram illustrating an exemplary device to guide light from the display device of FIG. 2 to an opening in the housing of the electronic device of FIG. 1 using mirrors.

FIG. 6 is a diagram illustrating an exemplary device 600 to guide light from a display area to a display opening using mirrors and a lens located at a display area. Device 600 may include instrument panel 115, display device 200, circuit board 310, a lens 605, a first mirror 610, and a second mirror 620. As illustrated, display device 200 may be mounted onto circuit board 310.

Lens 605 may include a lens that bends light to change the appearance of display area 210 to a different size. For example, lens 605 may change the appearance of display area 210 to the size of display opening 140.

First mirror 610 and second mirror 620 may guide light from display area 210 to display opening 140. Light exiting display area 210 may follow light path 640. Light may exit display area 210, travel upward, get reflected by first mirror 610 toward second mirror 620, get reflected by second mirror 820 toward the front, and travel to the front toward display opening 410. The use of two mirrors may allow the transmission of light through a right angle without inversion of light images.

Although FIG. 6 shows exemplary components of device 600, in other implementations, device 600 may contain fewer components, different components, additional components, or differently arranged components than depicted in FIG. 6. Additionally or alternatively, one or more components of device 600 may perform one or more tasks described as being performed by one or more other components of device 600.

Figure 7:
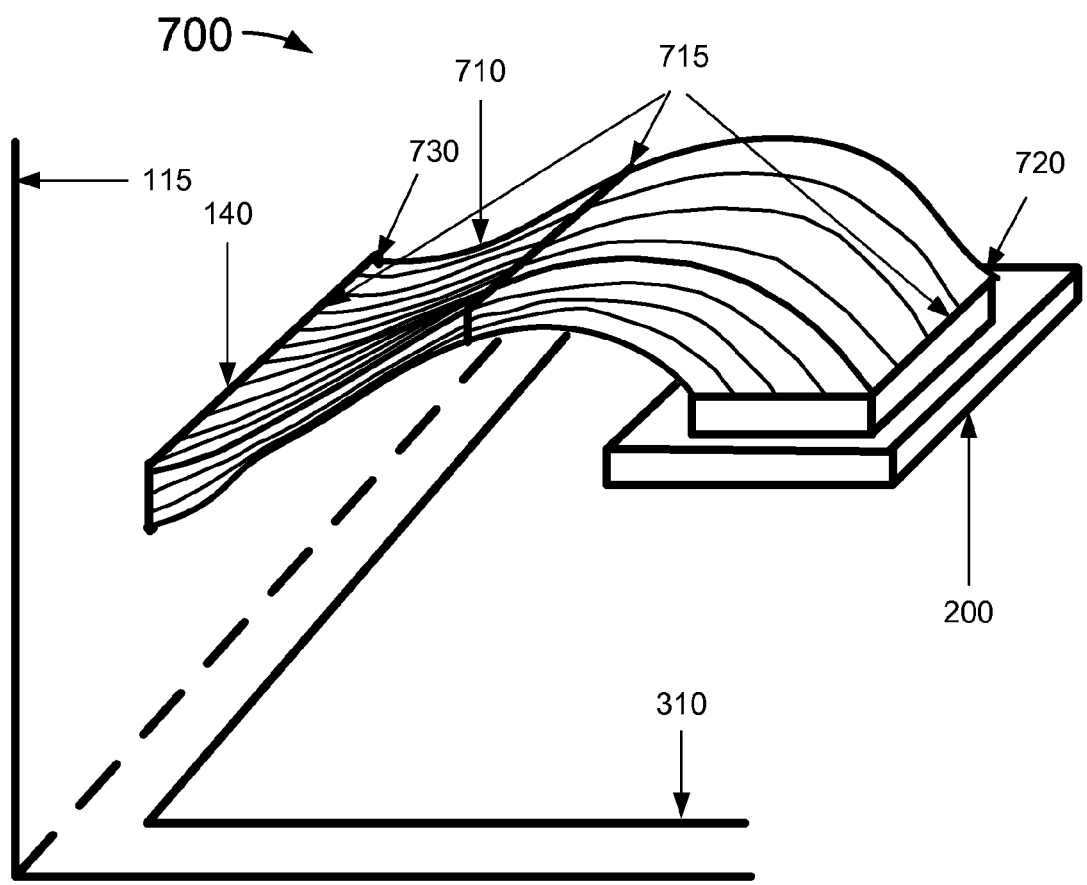
FIG. 7 is a diagram illustrating an exemplary device to guide light from the display device of FIG. 2 to an opening in the housing of the electronic device of FIG. 1 using optical fibers.

FIG. 7 is a diagram illustrating an exemplary device 700 to guide light from a display area to a display opening using optical fibers. Device 700 may include instrument panel 115, display device 200, circuit board 310, and optical fibers 710. As illustrated, display device 200 may be mounted onto circuit board 310.

Optical fibers 710 may include multiple optical fibers connecting display area 210 to display opening 140. Optical fibers may include one or more fasteners 715, a first surface area 720, and a second surface area 730. Fasteners 715 may secure the individual ones of optical fibers 710 together.

Fasteners 715 may secure first surface area 720 against display area 210. First surface area 720 may be positioned against display area 210 and may be approximately the same size as display area 210. First surface area 720 may be optically transparent to allow transmission of light from display area 210 into waveguide 320. Fasteners 715 may secure second surface area 730 against display opening 140. Second surface area 730 may be positioned against display opening 140 and may be approximately the same size as display opening 140. Second surface area 730 may be optically transparent to allow transmission of light from within waveguide 320 out through display opening 140.

The diameter of individual ones of optical fibers 710 may change along the length of the fibers. For example, the diameter of individual fibers may gradually change at either first surface area 720 or second surface area 730 to accommodate a difference in size between display area 210 and display opening 140. For example, the ends of individual ones of optical fibers 710 may be broadened at first surface area 720 or narrowed at second surface area 730. The broadening or narrowing of optical fibers 710 may be configured to achieve a desired magnification effect. For example, the ends of optical fibers 710 at second surface 730 may be narrowed to accommodate the smaller area of display opening 140 and may be provided with convex shape to make information viewable through display opening 140 appear larger. Thus, the ends of individual ones of optical fibers 710 may be shaped into lenses. Furthermore, ends of individual fibers at second surface 730 may be shaped to form a lens to make information viewable through display opening 140 appear larger.

Although FIG. 7 shows exemplary components of device 700, in other implementations, device 700 may contain fewer components, different components, additional components, or differently arranged components than depicted in FIG. 7. Additionally or alternatively, one or more components of device 700 may perform one or more other tasks described as being performed by one or more other components of device 700.

Figure 8A:
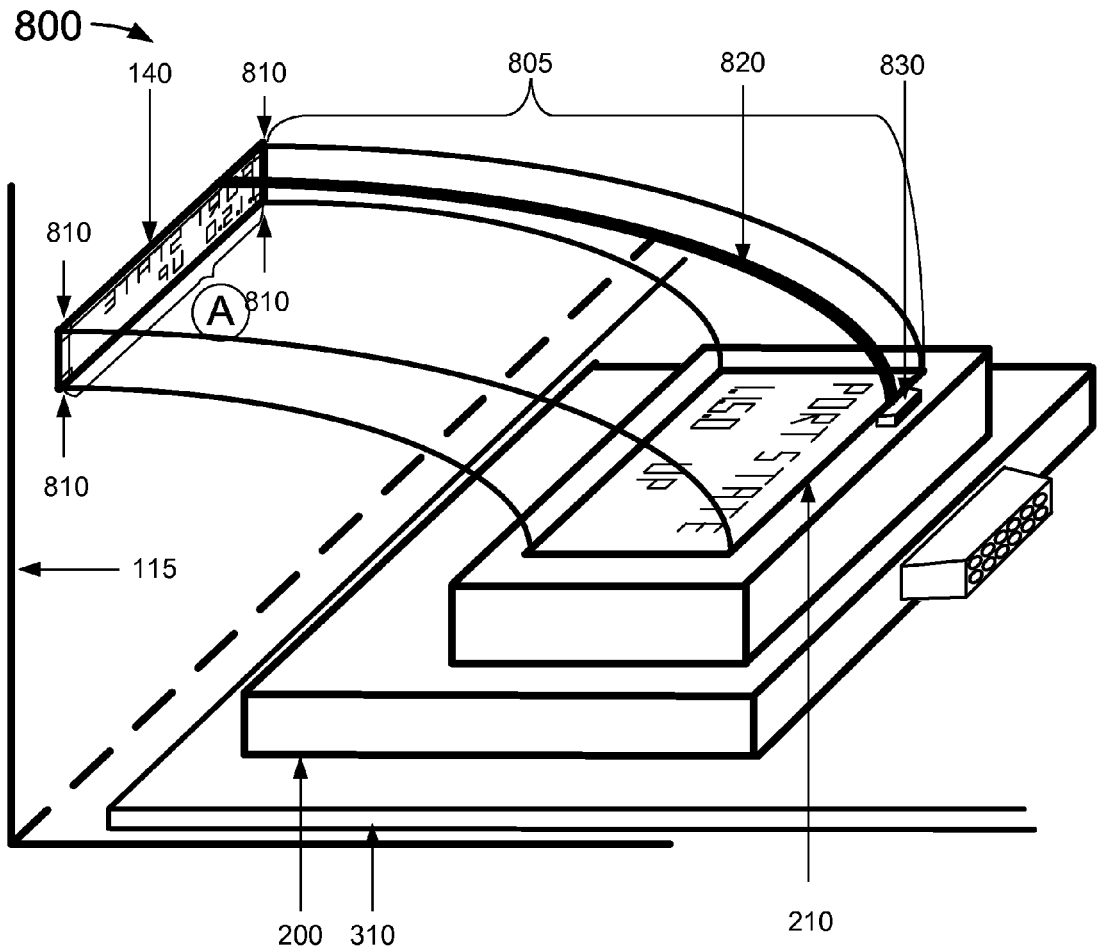
FIGS. 8A and 8B are diagrams illustrating an exemplary device, according to an implementation described herein, that includes touch sensors.
Figure 8B:
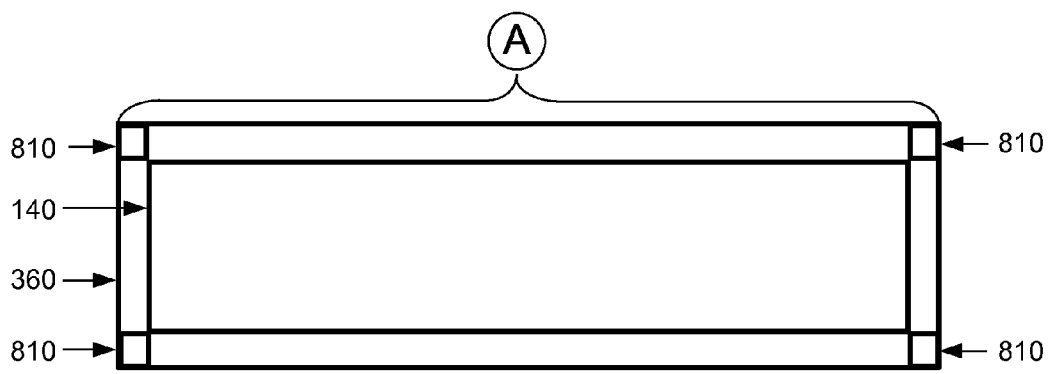

FIGS. 8A and 8B are diagrams illustrating an exemplary device 800, according to an implementation described herein, with includes touch sensors. In the implementation illustrated in FIGS. 8A and 8B, input devices 130 may not be provided on instrument panel 115. Rather, waveguide 320 may include touch sensors that may allow a user to interact with display device 200 by touching second surface 360 of waveguide 320 through display opening 140.

Device 800 may include instrument panel 115, display device 200, circuit board 310, and waveguide 805. As illustrated, display device 200 may be mounted onto circuit board 310. Waveguide 805 may include touch sensors 810, electrical connection 820, and connector plug 830.

Touch sensors 810 may be located on second surface 360 of waveguide 805. Second surface 360 of waveguide 805 may be larger than display opening 140, allowing touch sensors 810 to be located outside the area viewable through display opening 140 (FIG. 8B). For example, in one implementation, touch sensors 810 may include capacitive sensors located at each corner of second surface 360 of waveguide 805. A small amount of voltage may be applied to each corner of second surface 360, and when a finger touches a particular location on second surface 360, a small amount of current may be drawn to the particular location. An electric field controller coupled to touch sensors 810 may measure a ratio of currents from each corner to determine the particular touch location.

In another implementation, touch sensors 810 may be implemented as resistive touch sensors (not shown in FIGS. 8A and 8B). A resistive touch sensor may be implemented via a flexible optically transparent conductive film, such as an indium tin oxide (ITO) film separated from a second flexible optically transparent conductive film by a small space. When a particular location is pressed, the flexible optically transparent conductive films contact and a resulting change in voltage may be measured based on the location.

Electrical connection 820 may include a thin conductive film applied to a surface of waveguide 805. Electrical connection 820 may provide an electrical connection from touch sensors 810 to connector plug 830. Connection plug may enable touch sensors 810 to be electrically connected to an electric field controller that may determine a particular location of second surface 360 that is being touched.

Touch sensors 810 may allow a user to interact with display device 210. For example, touch sensors 810 may be used to scroll through contents being displayed in display area 210 or to select items being displayed in display area 210.

Although FIGS. 8A and 8B shows exemplary components of device 800, in other implementations, device 300 may contain fewer components, different components, additional components, or differently arranged components than depicted in FIGS. 8A and 8B. Additionally or alternatively, one or more components of device 800 may perform one or more tasks described as being performed by one or more other components of device 800.

Figure 9:
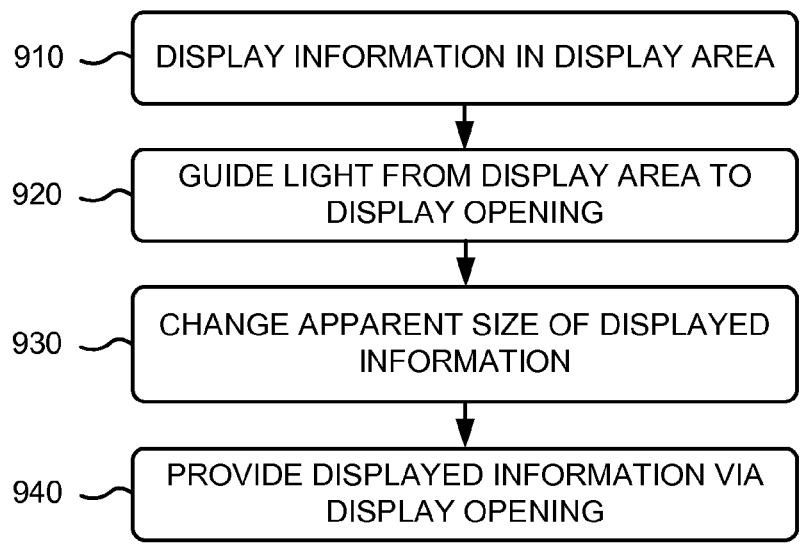
FIG. 9 is a diagram of a flow chart illustrating a process for providing displayed information from a display area to a display opening.

FIG. 9 is a diagram of a flow chart illustrating a process for providing displayed information from a display area to a display opening. In one implementation, the process of FIG. 9 may be performed by portion 300 of electronic device 100. In other implementations, some or all of the process of FIG. 9 may be performed by another device or a group of devices.

The process of FIG. 9 may include displaying information in a display area (block 910). For example, display device 200 may display a status of a particular communication interface device 120 in display area 210. Additionally, display device 200 may generate a backlight to light the displayed information. Light may be guided from a display area to a display opening (block 920). For example, waveguide 320 may guide light, and/or an image of the displayed information, from display area 210 to display opening 140. The apparent size of displayed information may be changed (block 930). For example, waveguide 320 may bend light from display area 210 to make the size of the displayed information appear to be approximately the size of display opening 140. The displayed information may be provided via a display opening (block 940). For example, waveguide 320 may cause the light from a backlight of display device 200 to exit display opening 140.

Figure 10:
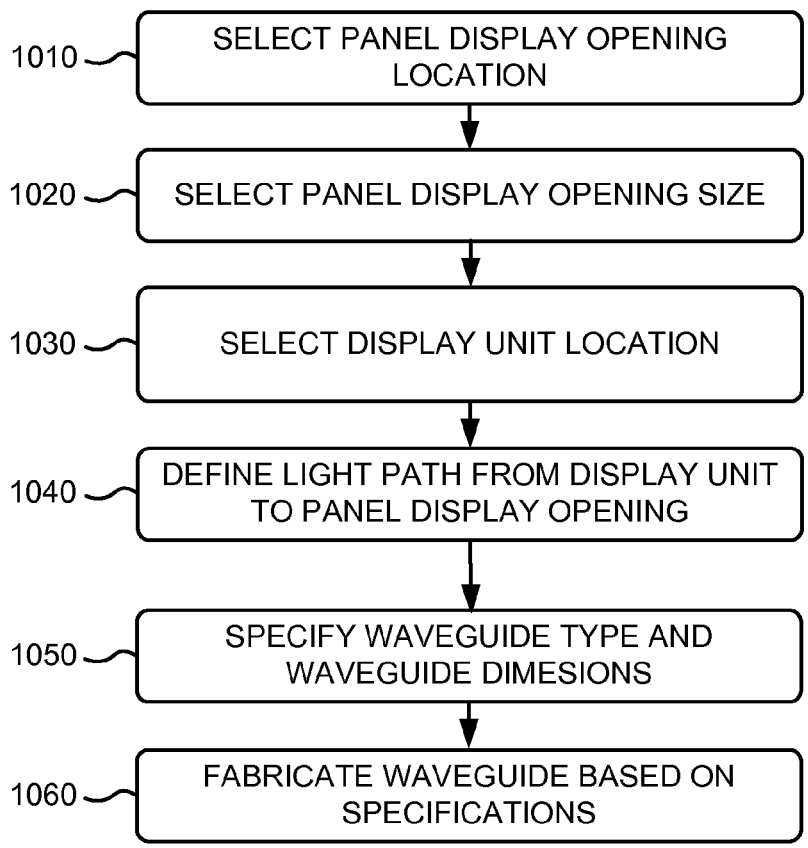
FIG. 10 is a diagram of a flow chart illustrating an exemplary process for forming a device according to an exemplary implementation described herein.

FIG. 10 is a diagram of a flow chart illustrating an exemplary process for forming a device according to an exemplary implementation described herein. The process of FIG. 10 may include selecting a panel display opening location (block 1010). Furthermore, a panel display opening size may be selected (block 1020). For example, a location of display opening 140 and a size of display opening 140 in instrument panel 115 may be selected based on the location of other devices mounted in instrument panel 115.

A display unit location may be selected (block 1030). For example, a location of display unit 210 on circuit board 310 may be selected based on the location of other components mounted on circuit board 310 and based on a location of display opening 310.

A light path from a display unit to a panel display opening may be defined (block 1040). For example, it may be determined how light emitted from, or reflected from, display area 210 is to reach display opening 140. Additionally, an amount of magnification may be determined to make display area 210 appear to be the size of display opening 140.

A waveguide type and waveguide dimensions may be specified based on the defined light path (block 1050). For example, one or more prisms, one or more mirrors, or one or more optical fibers may be selected for the waveguide type. Based on the defined light path from display area 210 to display opening 140 and based on the size of display area 210 and the size of display opening 140, dimensions for the selected waveguide may be determined.

A waveguide may be fabricated based on the specifications (block 1060). For example, the waveguide specifications may be provided to a control unit of a milling machine to shape a selected waveguide material into the specified dimensions.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 9-10, the order of the blocks may be modified in other implementations. Further, non-dependent blocks may be performed in parallel.

Still further, aspects have been mainly described in the context of a electronic device that includes a network element, such as a router, switch, gateway, or a firewall. As discussed above, the device and methods described herein may be used with any type of electronic device that displays information via a display device.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed:

1. An electronic device comprising:
   an instrument panel that includes a display opening,
      the instrument panel being located in a first plane;
   a circuit board located inside the electronic device,
      the circuit board being connected to a display device that includes a display area,
      the circuit board being located in a second plane that is different from the first plane,
      the display area being located inside of the electronic device, and
      the display device displaying information in the display area; and a waveguide to guide a light path from the display area towards the display opening in order to provide the information via the display opening of the instrument panel.

2. The electronic device of claim 1, where the waveguide connects to the display area and the display opening.

3. The electronic device of claim 1, where the waveguide includes:
a first surface area that is positioned against the display area,
a second surface area that is positioned against the display opening, and
one or more side surfaces.

4. The electronic device of claim 1, where the waveguide includes a surface area that is positioned against the display area, that is approximately a same size as the display area, and that is optically transparent.

5. The electronic device of claim 1, where the waveguide includes a surface area that is positioned against the display opening, that is approximately a same size as the display opening, and that is optically transparent.

6. The electronic device of claim 1, where the waveguide includes one or more optically reflective surfaces that reflect light internally within the waveguide.

7. The electronic device of claim 1, where the waveguide includes:
a first surface area,
the first surface area including a first fastening area that is used to fasten the first surface area to the display area, and
a second surface area,
the second surface area including a second fastening area that is used to fasten the second surface area to the display opening.

8. The electronic device of claim 1, where the waveguide includes a surface area that is directly fastened to a transparent covering of the display opening via a fusing technique that preserves optical transparency or via an optically transparent adhesive.

9. The electronic device of claim 1, where the waveguide includes an acrylic material.

10. A device comprising:
a panel that includes a display opening,
the panel being located in a first plane;
a board located inside the device,
the board being connected to a display device that includes a display area,
the board being located in a second plane that is different from the first plane,
the display area being located inside of the device, and
the display device displaying information in the display area; and
a waveguide, connected between the display area and the display opening, that provides the information from the display area to the display opening of the panel.

11. The device of claim 10,
where the waveguide includes a surface area that is positioned against the display opening, and
where the surface area includes a lens to change, when providing the information, a perceived size of the display area to a size of the display opening.

12. The device of claim 10, where the waveguide includes multiple prisms used together in a form of the waveguide.

13. The device of claim 10, where the waveguide includes refractive surfaces that refract light transmitted through the waveguide to change, when providing the information, a perceived size of the display area to a size of the display opening.

14. The device of claim 10, where the waveguide includes:
a rectangular first surface that is positioned against the display area,
a rectangular second surface that is positioned against the display opening, and
one or more curved side surfaces.

15. The device of claim 10,
where the waveguide includes multiple pieces that are serially arranged and not connected,
where, when providing the information, first light from a first piece, of the multiple pieces, enters second light from a second piece of the multiple pieces, and
where the first light and the second light provide the information from the display area towards the display opening.

16. The device of claim 10, where the waveguide includes touch sensors that allow a user to interact with the display device.

17. A method comprising:
displaying, by a display device of an electronic device, information in a display area of the display device,
the display area being located on a circuit board that is inside of the electronic device, and
the display area being in a first plane; and
guiding, by a waveguide of the electronic device, light from the display area to a display opening, of an instrument panel of the electronic device, in order to provide the information via the display opening,
the display opening being in a second plane that is different from the first plane.

18. The method of claim 17,
where the information is displayed in a first size in the display area,
were the information is displayed in a second size in the display opening, and
where the second size is smaller than the first size.

19. The method of claim 17, further comprising:
determining, by using a touch sensor of the electronic device, a particular location of a surface area of the waveguide that is being touched; and
changing the information being displayed by the display device, in the display area, based on determining the particular location of the surface area of the waveguide that is being touched.

20. The method of claim 17, where the waveguide includes:
a first surface area that is optically transparent and that is positioned against the display area,
a second surface area that is optically transparent and that is positioned against the display opening, and
side surfaces that include one or more optically reflective surfaces.

* * * * *